United States Patent [19]

Ko

[11] Patent Number: 4,877,633
[45] Date of Patent: Oct. 31, 1989

[54] PROCESS FOR IMPROVING THE COLOR OF PRAWNS, SHRIMP AND LOBSTERS

[76] Inventor: Yer-Lee Ko, No. 2, 11th Floor, Alley 9, Lane 38, Lin-Chuan St., Ling-Ya Dist., Kaohsiung, Taiwan

[21] Appl. No.: 242,313
[22] Filed: Sep. 8, 1988
[51] Int. Cl.$^4$ ............................................. A22C 29/02
[52] U.S. Cl. ................................... 426/506; 426/509; 426/520; 426/524
[58] Field of Search ................. 426/506, 520, 509, 524

[56] References Cited

U.S. PATENT DOCUMENTS 2,501,655  3/1950  Altenburg ........................... 426/506

Primary Examiner—Donald E. Czaja
Assistant Examiner—Drew S. Workman
Attorney, Agent, or Firm—Nixon & Vanderhye

[57] ABSTRACT

This invention provides a process for improving the shrimps and lobsters, which comprises quick-freezing the prawns, color of prawns, shrimps and lobsters to a certain low temperature before the heat treatment, a step conventionally used for changing the color of prawns, shrimps and lobsters to a beautiful pink red, and then cooling the heat treated prawns, shrimps or lobsters immediately after the heat treating step, so that the depth of color change can be easily regulated within an appropriate range, preventing the prawns, shrimps or lobsters from losing body fluid and destroying any qualities of freshness.

1 Claim, 2 Drawing Sheets (a)         (b)         (c)

PROCESS FOR IMPROVING THE COLOR OF PRAWNS, SHRIMP AND LOBSTERS

BACKGROUND OF THE INVENTION

The present invention relates to a process for improving the color of prawns, shrimps and lobsters, and more particularly to a process which can change the color of prawns, shrimps and lobsters to pink, so as to avoid the common misapprehension that said shellfish are rotting simply because the original color of these shellfish is black brown, closely mimicking the color of a rotted prawn, shrimp or lobster.

There is no problem of confusion on the part of the buyer while said prawns, shrimps and lobsters, (hereinafter generally referred to as "prawns"), are sold fresh, due solely to the fact that the buyer may inspect the prawns and see that they are alive. In such a case, the buyer would not queston the color of the prawns, suspecting that they are not fresh. However, it is very difficult to transport a gross amount of prawns from far fishing grounds or prawn farms and sell them as fresh food owing to the limitations of transportation technology and price competition. Therefore, most prawns are transported in a frozen state.

To improve the color of prawns, a conventional method is used to process the prawns before the step for freezing them. That is, after the prawns are washed and classified, the prawns are heated in order to change astaxanthin, a king of natural carotenoid pigment, which exists within the prawn bodies, to a red substance-astacin. In this way, the prawn bodies will take on a pink color assuring buyers of the freshness of the product and therefore advancing the commercial value of the as-processed prawns.

Referring to FIG. 1, the thickness of the color change of the as-processed prawns is very different, depending on the degree of heat applied to them. FIG. 1 (a), FIG. 1 (b) and FIG. 1 (c) respectively show a prawn which turns red fully from the surface to the core, a prawn the red penetration of which comprises half of its whole thickness, and a prawn the red penetration of which comprises one third of its whole thickness. In these figures, H1, H2 and H3 respectively express depth of the red penetration. The red-penetrated thickness is preferably between 0.5-1 mm. If the depth of the red penetration is lower than 0.5 mm, the prawns may return to their original color, owing to the reduction in the reacted astaxanthin. As the depth of the red penetration in the prawn's body reaches a level higher than 1 mm, the body fluid of the prawns will be greatly reduced because of the associated heat treatment therefore causing the complete loss of any sense of freshness.

The temperature of washed and classified prawns is usually as low as 4 degrees centigrade. However, when they are treated by hot water of a temperature of nearly 100 degrees centigrade, the heat penetration rate will be very high and this heat remaining in the prawn body will enlarge the area of red penetraton radially, towards the core portion. Therefore, the regulation of the depth of red penetration is very difficult, depending almost entirely on the experience of a worker.

Towards this drawback, a suggestion is provided in the form of a lowering of the heat penetration rate by a reducing of the temperature of the hot water However, as the temperature of the hot water is lowered, the period for treating prawns will also have to be prolonged, allowing the heat of the water to have enough time to penetrate into the core portion of each prawn, so the inside of each prawn body will have a broad area that is partially penetrated by the red color.

SUMMARY OF THE INVENTION

The object of the present invention is therefore to provide a process for improving the color of prawns, by which the above-mentioned drawback can be entirely solved.

Accordingly, the present invention provides a process which quick-freezes the prawns to a certain low temperature before the heat treatment and cools the same immediately after the heat treatment.

More specifically, the process of the present invention comprises the following steps:
(a) quick-freezing the prawns to a certain temperature;
(b) heating the quick-frozen prawns for a certain period; and
(c) immediately cooling the heated prawns to a certain temperature.

According to a series of experiments, step (a) is preferably carried out to lower the core temperature of the prawns to −25 degrees centigrade, step (b) is preferably carried out by treating the quick-frozen prawns with hot water of between 90–100 degrees centigrade for 20–40 seconds, and said step (c) is preferably carried out by treating the heated prawns with cold water of 4 degres centigrade.

Owing to the heat treating step carried out after the quick-freezing step, the prawns are pre-frozen and have a high capacity with a latent heat of about 65 cal/g, for defrosting and absorbing the heat which has penetrated into their bodies before the change in temperature, thus enabling the prawn bodies to prevent color change from all areas except their surface.

Owing to the fact that the cooling step is carried out right after the heat treating step, the heat remaining in the prawn bodies will step, the heat remaining in the prawn bodies will dissipate immediately, preventing any enlargement of the color-change ara.

EXPERIMENTS

Figure 1:
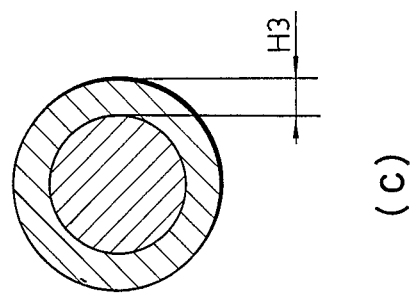
FIG. 1 is a series of sectional views illustrating the depth of color change in a heat-treated prawn.
Figure 1:
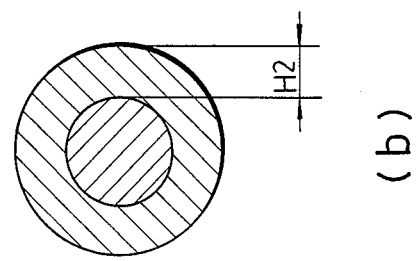
Figure 1:
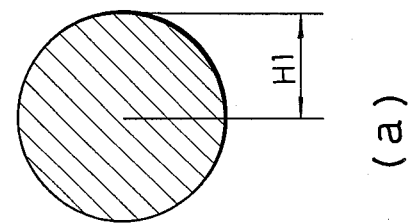
Figure 2:
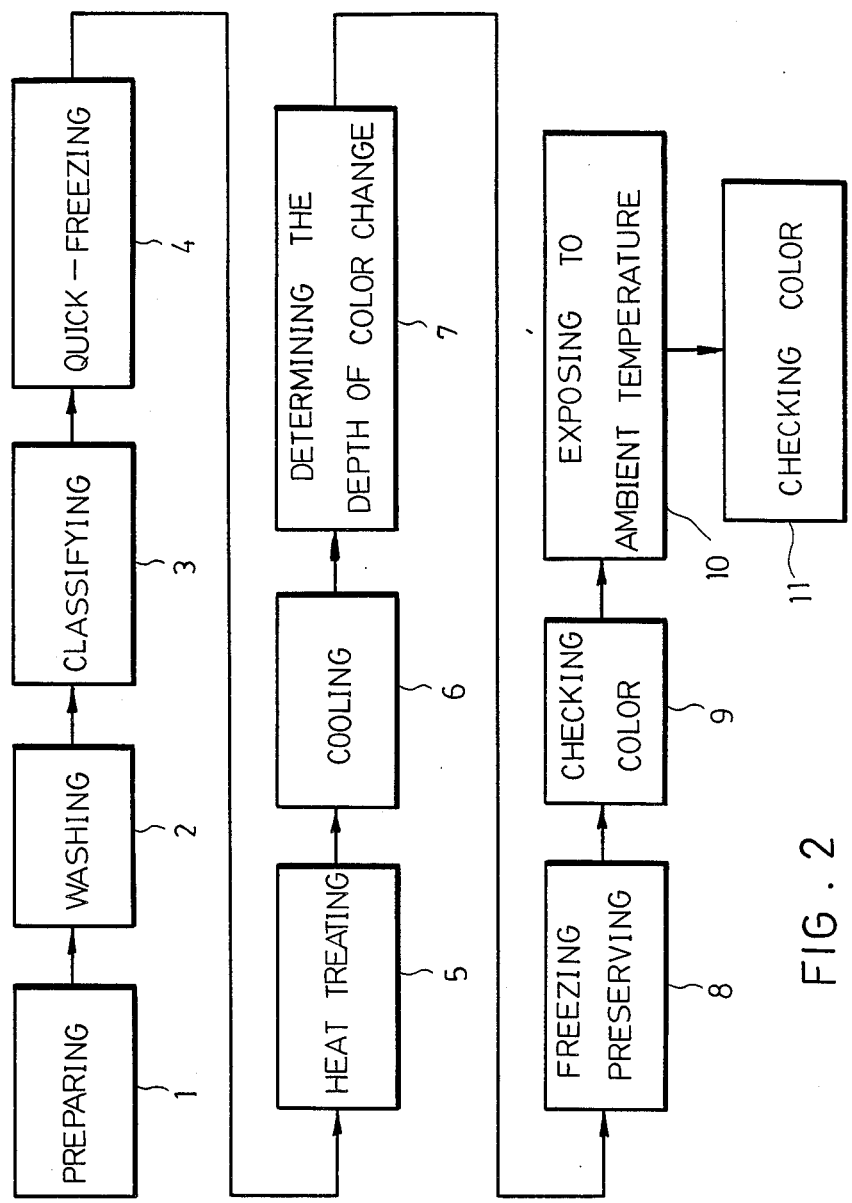
FIG. 2 is a block diagram showing the procedures of the experiments carried out in this disclosure.

As shown in FIG. 2, the experiments were carried out according to the following procedures:
(1) preparing a gross number of raw prawns;
(2) washing the raw prawns with cold water of a temperature of 4 degrees;
(3) classifying the raw prawns into several size ranges;
(4) quick-freezing the classified prawns until the temperature of their core portion is reduced to the certain value indicated in Table 1;
(5) heat treating the quick-frozen prawns by hot water for a short period, according to the conditions indicated in Table 1;
(6) cooling the heat treated prawns by cold water of the temperature indicated in Table 1;
(7) determining the depth of color change in the resulting prawns;

(8) freezing the resulting prawns and preserving them in cold storage for a period of 3 months;
(9) checking the color of the prawns;
(10) exposing the prawns to ambient temperature for a period of 1 week; and
(11) checking the color of the prawns.

The results of said experiments are listed in Table 1, together with the experimental conditions.

TABLE 1

|  | Experiment | | | | |
| --- | --- | --- | --- | --- | --- |
|  | 1 | 2 | 3 | 4 | 5 |
| Core Temperature (degrees centigrade) | −20 | −25 | −25 | −25 | −25 |
| Temperature of Heat Treating Water (degrees centigrade) | 90 | 95 | 90 | 95 | 100 |
| Time for Heat Treatment (seconds) | 30 | 20 | 40 | 35 | 25 |
| Temperature of Quenching water (degrees centigrade) | 4 | 4 | 4 | 4 | 4 |
| Depth of Color Change (mm) | 0.8 | 0.5 | 1 | 1 | 0.8 |
| The Color After Defrosting | pink red | | | | |
| The Color After The Prawns Are Exposed to Ambient Temperatures | darkish red | | | | |

According to the results of such experiments, the following advantages are shown:

The first being that, the fact that the prawns are quick-frozen immediately after they are washed and classified preserves their freshness.

Th second being that, the fact that the prawns are quick-frozen before the heat treatment is carried out facilitates regulation of the depth of color change in the prawns and enables the prawn bodies to maintain moisture.

The third being that, the fact that the prawns are cooled by cold water right after they are heat treated, allows the heat remaining in the prawn bodies to immediately dissipate, utterly stopping the enlargement of the area of red penetration.

The fourth being that, the fact that the depth of color change of the as-processed prawns is very thin means that the natural pigment may be preserved without destruction, still allowing the prawns to turn brown, warning consumers that they have gone bad.

While the invention has been described in connection with what is presently considered to be the most practical and preferred embodiment, it is to be understood that the invention is not to be limited to the disclosed embodiment, but on the contrary, is intended to cover all the various modifications and equivalent arrangements included within the spirit and scope of the broadest interpretation.

I claim:

1. A process for improving the color of prawns, shrimps and lobsters, comprising the successive steps of:
   (a) quick-freezing the raw prawns, shrimps or lobsters until the core temperature of same is reduced to about −25° C.;
   (b) heating the quick-frozen prawns, shrimps or lobsters at between about 90° to 100° C. for about 20 to 40 seconds; and
   (c) cooling the heated prawns, shrimps or lobsters with cold water to a temperature of about 4° C. immediately after step (b).

* * * * *